Patented Jan. 23, 1945

2,367,798

UNITED STATES PATENT OFFICE 2,367,798

ALLYL AND METHALLYL ESTERS OF LACTIC AND ALPHA-ACETOXYPROPIONIC ACIDS

Chessie E. Rehberg, Philadelphia, and Charles H. Fisher, Abington, Pa., assignors to Claude R. Wickard, as Secretary of Agriculture of the United States of America, and his successors in office No Drawing. Application February 4, 1943,
Serial No. 474,757

2 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to new and useful allyl and methallyl esters of lactic and alpha-acetoxypropionic acids, namely, allyl lactate, beta-methylallyl lactate (hereinafter referred to as "methallyl lactate"), allyl alpha-acetoxypropionate, and beta-methylallyl alpha-acetoxypropionate (hereinafter referred to as "methallyl alpha-acetoxypropionate"), having the formulae:

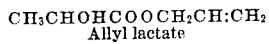
Allyl lactate

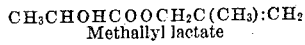
Methallyl lactate

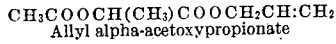
Allyl alpha-acetoxypropionate

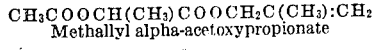
Methallyl alpha-acetoxypropionate

The object of our invention is the production of compounds that are useful as solvents, plasticizers, chemical intermediates and as starting materials in the production of allyl acrylate and beta-methylallyl acrylate which are substances polymerizable into plastic, semi-solid, or solid materials useful in industry because of their tensile strength, elasticity, plasticity, resistance to water, organic liquids and gases, and because of other desirable properties.

It is well known (Burns, Jones and Ritchie, J. Chem. Soc. 1935, 400-6, 714-7; Claborn, U. S. 2,222,363, Nov. 19, 1940; Claborn, U. S. 2,229,997, Jan. 28, 1941; Smith, Fisher, Ratchford and Fein, Ind. Eng. Chem. 34, 473-9 (1942)) that methyl alpha-acetoxypropionate can be decomposed thermally to yield as a principal product methyl acrylate, which can be converted by polymerization into substances useful in the plastics and related industries. However, the alkyl alpha-acetoxypropionates of higher molecular weight have been observed to be unsuitable for production of the corresponding alkyl acrylates because of the preponderance of undesirable reactions which lead to the formation of products other than the acrylates, and because the alkyl acrylates formed yield polymers which lack the properties considered desirable in industry.

We have found that the presence of an olefin linkage between the beta and gamma carbon atoms of the alkoxy group decreases the undesirable side reactions encountered in the pyrolysis of the alkyl alpha-acetoxypropionates of higher molecular weight, and that, owing to the characteristics of the allyl and substituted allyl radicals and their esters, their alpha-acetoxypropionates can be converted readily and in good yields into allyl and substituted allyl acrylates (as shown below), which can be polymerized and interpolymerized into materials useful in industry.

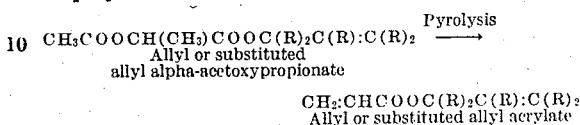

(where R is hydrogen or alkyl group).

Thus we have found that allyl lactate, methallyl lactate, allyl alpha-acetoxypropionate, and methallyl alpha-acetoxypropionate are new and useful compounds, which are solvents and plasticizers, and which are readily convertible into the corresponding acrylates and polymers and interpolymers thereof.

Allyl lactate can be made by the interaction of lactic acid and allyl alcohol or by treating metallic salts of lactic acid with an allyl halide. Methallyl lactate can be made from lactic acid and methallyl alcohol by esterification or from a metal lactate and a beta-methylallyl halide. Allyl and methallyl alpha-acetoxypropionates can be prepared from allyl and methallyl lactates, respectively, by acetylation with any of the common acetylating agents. Allyl and methallyl alpha-acetoxypropionates can be made also by treatment of alpha-acetoxypropionyl chloride or alpha-acetoxypropionic anhydride with allyl and methallyl alcohol, respectively.

*Example I.*—Two moles (180.2 g.) of essentially 100 percent lactic acid, 2.2 moles (127.8 g.) of allyl alcohol, 200 cc. of benzene and 3 cc. of concentrated sulfuric acid were refluxed three hours while water was continuously removed as formed by use of a trap. Benzene and unreacted allyl alcohol were removed by distillation under about 20 mm. pressure, after which allyl lactate was distilled under 1 mm. pressure, its boiling point under this pressure being 27-29° C. The yield was 88 g., or 34 percent of the theoretical. More of the ester, allyl lactate, was obtained by adding allyl alcohol, benzene and acid catalyst to the distillation residue, refluxing and then distilling the reaction mixture as before.

*Example II.*—Two moles (180.2 g.) of essentially 100 percent lactic acid was dehydrated by refluxing with benzene, a trap being used to remove water. After complete removal of water (34 cc.), 6 moles of allyl alcohol was added and the mixture was refluxed several hours. The benzene and excess alcohol was then removed by fractional distillation, the final stage being carried out under a pressure of about 20 mm. The allyl lactate was then distilled at 60° C. under 7 mm. pressure, 45 g. being obtained. The recovered alcohol was returned to the reaction vessel containing the distillation residue, 1-2 g. of p-toluenesulfonic acid was added, and the mixture again refluxed for several hours. Upon distillation, 159 g. of allyl lactate was obtained. The total yield was thus 204 g., or 78 percent of the theoretical. The residue (presumably polylactic acid) could doubtless be used again or added to a new batch of material, thus eventually converting virtually all of it into ester.

Allyl lactate is a clear, colorless, mobile liquid at room temperature with a mild and not unpleasant odor; boiling at 60° C. under 7 mm. of mercury pressure, 79° C. under 25 mm., and 175.5° C. under 754 mm. pressure; having a specific gravity of 1.0452 at 20° C., and having a refractive index for the yellow sodium line of 1.4369 at 20° C.

*Example III.*—Using essentially the same procedure as in Example I, there was obtained from 3 moles (270 g.) of lactic acid and 3.3 moles (238 g.) of beta-methylallyl alcohol 143 g. of ester, this being 33 percent of the theoretical amount. As before, more of the ester was obtained by treating the distillation residue with beta-methylallyl alcohol, refluxing and distilling.

*Example IV.*—Five moles (450 g.) of lactic acid and 5.5 moles (396 g.) of beta-methylallyl alcohol were treated as in Example I, the yield of ester being 212 g. The recovered alcohol was then returned to the reaction flask containing the lactic acid residue and refluxed for several hours. Distillation then gave 115 g. of ester. A third period of reflux of alcohol and lactic acid residue yielded 39 g. of ester, a fourth yielded 34 g., and a fifth, 16.6 g. Addition of 50 cc. of fresh alcohol and 1 cc. of phosphoric acid raised the yield in the sixth period to 29 g. A further addition of 100 cc. of alcohol gave a yield of 14 g. in the final reaction period, the total yield being 460 g., or 64.6 percent of the theoretical. The product was collected at 77-79° C. under 11 mm. pressure.

Beta-methylallyl lactate is a clear, colorless, mobile liquid at room temperature, with mild odor; having boiling points of 69° C. under 8 mm. and 78° C. under 11 mm. of pressure; having a specific gravity of 1.0181 at 20° C., and having a refractive index for the yellow sodium line of 1.4389 at 20° C.

*Example V.*—To 1.5 moles (195 g.) of allyl lactate there was slowly added, with stirring, 1.65 moles (168 g.), 10 percent excess, of acetic anhydride. The mixture was warmed to 50-60° C. to start the reaction, after which cooling was used to keep the temperature below 100-110° C. After standing an hour the mixture was fractionated under a pressure of 7 mm., the product being collected at 80-81° C. The yield was 230 g., or 89 percent of the theoretical.

Allyl alpha-acetoxypropionate is a clear, colorless, mobile liquid of slight, though pleasant, odor; having a boiling point of 81° C. under 7 mm.; having a specific gravity of 1.0544 at 20° C.; and having a refractive index for the yellow sodium line of 1.4270 at 20° C.

*Example VI.*—Using essentially the procedure described in Example V, except that 1-2 cc. phosphoric acid was used as a catalyst and the temperature was maintained at 60-80° C., there was obtained from 1.5 moles of beta-methylallyl lactate and 1.8 moles of acetic anhydride a yield of 260 g. of beta-methylallyl alpha-acetoxypropionate, this being 93 percent of the theoretical yield. The product was collected at 100-102° C. at 12 mm. pressure.

Beta-methylallyl alpha-acetoxypropionate is a clear, colorless, mobile liquid with a slight, pleasant odor; having boiling points of 76° C. under 3 mm., 87° C. under 5 mm., and 95° C. under 10 mm. pressure; having a specific gravity of 1.0330 at 20° C., and having a refractive index for the yellow sodium line of 1.4314 at 20° C.

*Example VII.*—Aqueous sodium lactate (84.5 g. of 64 percent by weight sodium lactate) and 67.8 g. of beta-methylallyl chloride were heated in a rocking stainless steel autoclave at 120-180° C. for 5 hours. A moderate yield of methallyl lactate was obtained by fractional distillation of the reaction mixture.

Having thus described our invention, we claim:

1. A composition of matter comprising allyl alpha-acetoxypropionate represented by the formula $CH_3COOCH(CH_3)COOCH_2CH:CH_2$.

2. A composition of matter comprising beta-methylallyl alpha-acetoxypropionate represented by the formula $$CH_3COOCH(CH_3)COOCH_2C(CH_3):CH_2$$

CHESSIE E. REHBERG.
CHARLES H. FISHER.